No. 855,010. PATENTED MAY 28, 1907.
M. C. A. LATOUR.
ALTERNATING CURRENT MOTOR.
APPLICATION FILED JUNE 18, 1904.

2 SHEETS—SHEET 1.

WITNESSES:

INVENTOR:
Marius Charles Arthur Latour,
By
Att'y.

No. 855,010. PATENTED MAY 28, 1907.
M. C. A. LATOUR.
ALTERNATING CURRENT MOTOR.
APPLICATION FILED JUNE 18, 1904.

2 SHEETS—SHEET 2.

Witnesses.
J. Ellis Glen.
Helen Alford

Inventor.
Marius Charles Arthur Latour.
by Albert S. Davis
Att'y.

UNITED STATES PATENT OFFICE.

MARIUS C. A. LATOUR, OF PARIS, FRANCE, ASSIGNOR TO GENERAL ELECTRIC COMPANY, A CORPORATION OF NEW YORK.

ALTERNATING-CURRENT MOTOR.

No. 855,010.  Specification of Letters Patent.  Patented May 28, 1907.

Application filed June 18, 1904. Serial No. 213,056.

*To all whom it may concern:*

Be it known that I, MARIUS C. A. LATOUR, a citizen of France, residing at Paris, France, have invented certain new and useful Improvements in Alternating-Current Motors, of which the following is a specification.

My invention relates to alternating-current motors of the commutator type, and its object is to provide a novel arrangement and control for such a motor whereby it is enabled to start with the high torque of a repulsion motor, and to operate at practically constant speed like a shunt or an induction motor.

The ordinary repulsion motor, the stator of which is provided with a distributed winding to which single-phase current is supplied, the rotor being short-circuited on a line at an angle to the field magnetization, has an excellent starting torque and works very well in the neighborhood of synchronous speed as far as commutation is concerned, but its operation is not stable as regards speed. A slight change in load produces a large change in its speed, and when the speed rises much above synchronism severe sparking is produced. Consequently this motor is not very suitable for working at constant speed under variable load. The single-phase induction motor, on the other hand, has no starting torque, but operates at substantially constant speed under all loads, and the shunt motor, which has little starting torque, is also a substantially constant-speed motor.

My present invention consists in providing proper connections for starting a motor as a repulsion motor, together with suitable controlling means for transforming it into a constant-speed motor, such as a shunt or induction motor, when up to speed.

Figure 1:
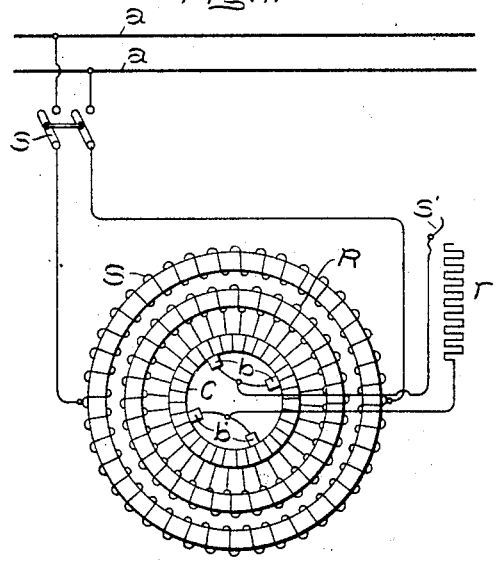
Figure 2:
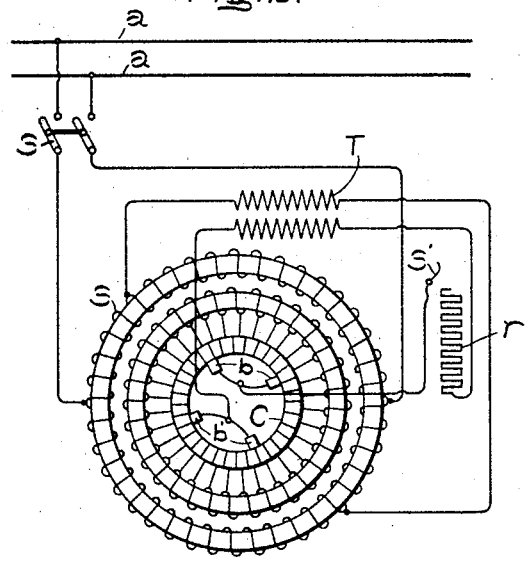
Figure 3:
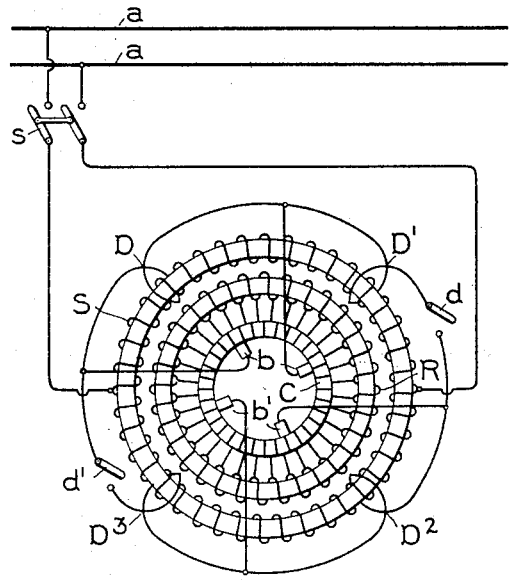
Figure 4:
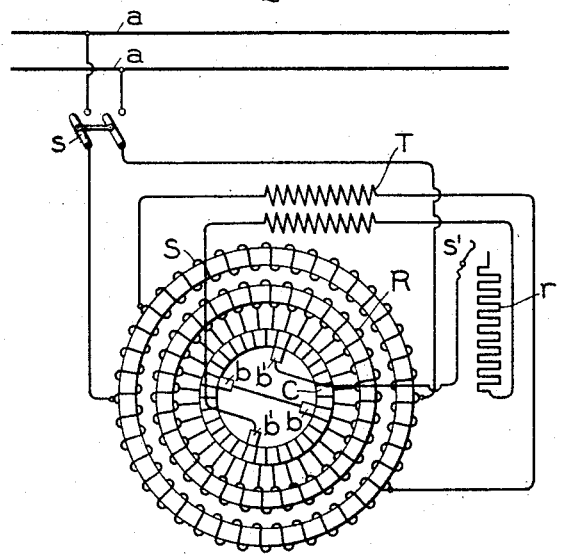

My invention will best be understood by reference to the accompanying drawings, in which Figure 1 shows diagrammatically a motor arranged in accordance with my invention; Fig. 2 shows a modification of the same, in which the motor may be connected as a shunt motor when up to speed; Fig. 3 shows a modification in which a polyphase excitation is employed for the rotor; and Fig. 4 shows a modified arrangement of the commutator brushes and their connections.

In Fig. 1, S represents an ordinary stator with a distributed winding, the terminals of which are connected through the switch $s$ to the source of single-phase current $a\ a$. The current in the winding of stator S produces a magnetization on the line of the stator terminals. R represents the rotor, which is provided with the commutator C on which bear two sets of brushes $b\ b$ and $b'\ b'$. Each set of brushes is short-circuited, the short-circuits being on parallel lines at an angle to the line of magnetization of the stator. The motor consequently starts as an ordinary repulsion motor. When the motor is up to speed, the switch $s'$ may be closed, thereby interconnecting the two short-circuits. This establishes two more closed circuits on parallel lines at an angle to the first. Four points on the rotor winding are now electrically connected to each other, and the motor acts as a single-phase induction motor. The resistance $r$ is provided in the circuit connecting the two short-circuits, so that the change from the repulsion motor action to the induction motor may be gradual. This resistance $r$ may be gradually cut out after the switch $s'$ has been closed.

Instead of directly short-circuiting the two short-circuiting connections, the connection between them may be made through a source of voltage. Thus, in Fig. 2 I have shown the switch $s'$ interconnecting the two short-circuits through the secondary of the transformer T. The primary of the transformer may be connected to any suitable source of current, and in this case I have shown it connected to extra terminals on the stator winding which are selected, as regards their position, for giving a voltage of the proper phase. It will be seen that this connection of the two short-circuits through a source of voltage practically transforms the motor from a repulsion motor to a shunt motor, the shunt excitation, produced by the voltage impressed on the rotor, being at right angles to the lines on which the rotor was first short-circuited, and consequently nearly at right angles to the line of magnetization produced by the stator winding. As in Fig. 1, a resistance $r$ controlled by the switch $s'$ is employed for producing a gradual transition.

Instead of the shunt excitation shown in Fig. 2, a polyphase excitation may be employed on the rotor, if desired. Thus, in Fig. 3 I have shown the brushes $b$ short-circuited through an auxiliary coil D on the stator.

The brushes $b'$ are short-circuited through a similar coil $D^2$. The electromotive forces of the coils D and $D^2$ are small compared to the induced electromotive force in the winding at starting, so that at starting the effect is the same as though the brushes were directly short-circuited, as in the former figures. Two other auxiliary coils $D'$ and $D^3$ are provided, together with switches $d$ and $d'$, by means of which each coil may be connected between a brush $b$ and a brush $b'$, so as to short-circuit two sets of brushes on each other through these coils. The rotor is thus short-circuited through a source of polyphase excitation which serves to improve the efficiency and power factor of the motor when the motor is up to speed. Instead of obtaining the polyphase excitation from auxiliary coils on the stator, it obviously may be obtained from any suitable source of polyphase voltage, as from auxiliary field terminals.

Although in the arrangements shown heretofore, the rotor has been short-circuited at the start on two parallel lines at an angle to the line of magnetization of the primary member, it is obvious that other arrangements may be employed. For instance, in Fig. 4 I have shown the rotor with its commutator brushes arranged so as to produce only a single short-circuit at the start. A second set of brushes $b'$ $b'$ are displaced approximately 90 degrees from the first set, and the switch $s'$ is arranged to close the circuit of these brushes and thereby to close the rotor circuit on a second line at an angle to the first through a source of potential in the same manner as in the arrangement of Fig. 2. The operation with this arrangement of brushes is practically the same as the operation with the two parallel short-circuits, except that since the induced voltage at the brushes is greater with the arrangement of Fig. 4, the commutation is not as good as in the arrangement of the former figures. Instead of closing the circuit of the brushes $b'$ in Fig. 4 through a source of shunt excitation, evidently a simple short-circuit may be employed for these brushes, or a polyphase excitation may be used with this arrangement of brushes, as in Fig. 3.

Although in the drawings I have merely indicated diagrammatically the switch for changing the motor connections to transform the motor from a repulsion to an induction or shunt motor, it will be understood that this switch may be of any well-known type, either manually or automatically actuated when the motor is up to speed. Furthermore, although for the sake of simplicity, I have shown Gramme ring windings on both members, it will be understood that the usual construction for induction motors is employed, the stator and rotor bodies being built up of laminations and the windings being placed in slots or holes in the laminations. Accordingly I do not desire to limit myself to the particular construction and arrangement of parts shown, and I aim in the appended claims to cover all such modifications which are within the scope of my invention.

What I claim as new and desire to secure by Letters Patent of the United States, is,—

1. In an alternating-current motor, a distributed primary winding, a secondary winding provided with a commutator, means for closing the circuit of the secondary winding at starting on a line at an angle to the line of field magnetization, and means for closing the circuit of the secondary winding on a second line at an angle to the first when the motor is up to speed.

2. In an alternating-current motor, a distributed primary winding, a secondary winding provided with a commutator, means for closing the circuit of the secondary at starting on a line at an angle to the line of field magnetization, and means for closing the circuit of the secondary winding through a source of voltage on a second line at an angle to the first when the motor is up to speed.

3. In an alternating-current motor, a distributed primary winding, a secondary winding provided with a commutator, means for closing the circuit of the secondary winding at starting on a line at an angle to the line of field magnetization, and means for impressing a voltage on the secondary winding on a line at an angle to the first when the motor is up to speed.

4. In an alternating-current motor, a distributed primary winding, a secondary winding provided with a commutator, means for closing the circuit of the secondary winding at starting on a line at an angle to the line of field magnetization, and means for impressing a shunt excitation on the secondary winding on a line at an angle to the first when the motor is up to speed.

5. In combination with an alternating-current motor of the commutator type, means for connecting it at the start as a repulsion motor, and means for connecting it as a shunt motor when it is up to speed.

6. In combination with an alternating-current motor of the commutator type, means for short-circuiting the rotor to cause the motor to start as a repulsion motor, and means for establishing additional connections from the rotor to source of voltage to cause the motor to operate as a shunt motor.

7. In an alternating-current motor, a distributed primary winding supplied with alternating-current, a secondary member provided with a distributed winding connected at intervals to the segments of a many-part commutator, brushes bearing on said commutator, connections for short-circuiting the secondary winding through the brushes on a line at an angle to the line of the field magnetization, connections for feeding an exciting current through said brushes on a line displaced substantially 90 electrical degrees from the line of the short-circuit, and a switch in the circuit of the latter connections for opening the circuit at starting and closing it at normal speed.

8. In an alternating-current motor, a distributed primary winding, a secondary winding provided with a commutator, brushes bearing on said commutator and arranged and connected to short-circuit said secondary winding on parallel lines at an angle to the field magnetization, and means for interconnecting the parallel short-circuits when the motor has started.

9. In an alternating-current motor, a distributed primary winding, a secondary winding provided with a commutator, brushes bearing on said commutator and arranged and connected to short-circuit said secondary winding on parallel lines at an angle to the field magnetization, and means for interconnecting the parallel short-circuits through a source of voltage.

10. In an alternating-current motor, a distributed primary winding, a secondary winding provided with a commutator, brushes bearing on said commutator and arranged and connected to short-circuit said secondary winding on parallel lines at an angle to the field magnetization, and means for connecting the parallel short-circuits to a source of shunt excitation.

11. In an alternating-current motor, a distributed primary winding, a secondary winding provided with a commutator, brushes bearing on said commutator and arranged and connected to short-circuit said secondary winding on parallel lines at an angle to the field magnetization so as to start the motor as a repulsion motor, and means for interconnecting the parallel short-circuits through a source of shunt excitation so as to operate the motor as a shunt motor.

12. In an alternating-current motor, a distributed primary winding, a secondary winding provided with a commutator, four commutator brushes per pair of poles arranged and connected in pairs so as to form two parallel short-circuits at an angle to field magnetization, and means for connecting said parallel short-circuits to a source of voltage.

13. In an alternating-current motor, a distributed primary winding, a secondary winding provided with a commutator, four brushes per pair of poles bearing on said commutator and arranged and connected in pairs so as to form two parallel short-circuits at an angle to the field magnetization, and means for supplying to the secondary winding through said short-circuiting connections a current derived from the field.

14. In combination, a repulsion motor having two sets of commutator brushes, said sets being displaced from each other by approximately 90 electrical degrees and both sets being displaced from the line of magnetization of the primary member, means for short-circuiting one set, and means for closing the circuit of the other set through a source of compensating electromotive force when the motor is up to speed.

15. In combination, a repulsion motor having two sets of commutator brushes, said sets being displaced from each other by approximately 90 electrical degrees and both sets being displaced from the line of magnetization of the primary member, means for short-circuiting one set, and means for impressing a variable voltage on the other set.

16. In combination, a repulsion motor having two sets of commutator brushes, said sets being displaced from each other by approximately 90 electrical degrees and both sets being displaced from the line of magnetization of the primary member, a source of voltage, and a switch adapted to close the circuit of the second set of brushes through said source when the motor is up to speed.

17. In combination, a repulsion motor having two sets of commutator brushes, said sets being displaced from each other by approximately 90 electrical degrees and both sets being displaced from the line of magnetization of the primary member, means for short-circuiting one set, and means for connecting the second set to a portion of the winding of the primary member of the motor.

In witness whereof, I have hereunto set my hand this 16th day of June, 1904.

MARIUS C. A. LATOUR.

Witnesses:
    EDWARD WILLIAMS, Jr.,
    L. A. HAWKINS.